UNITED STATES PATENT OFFICE.

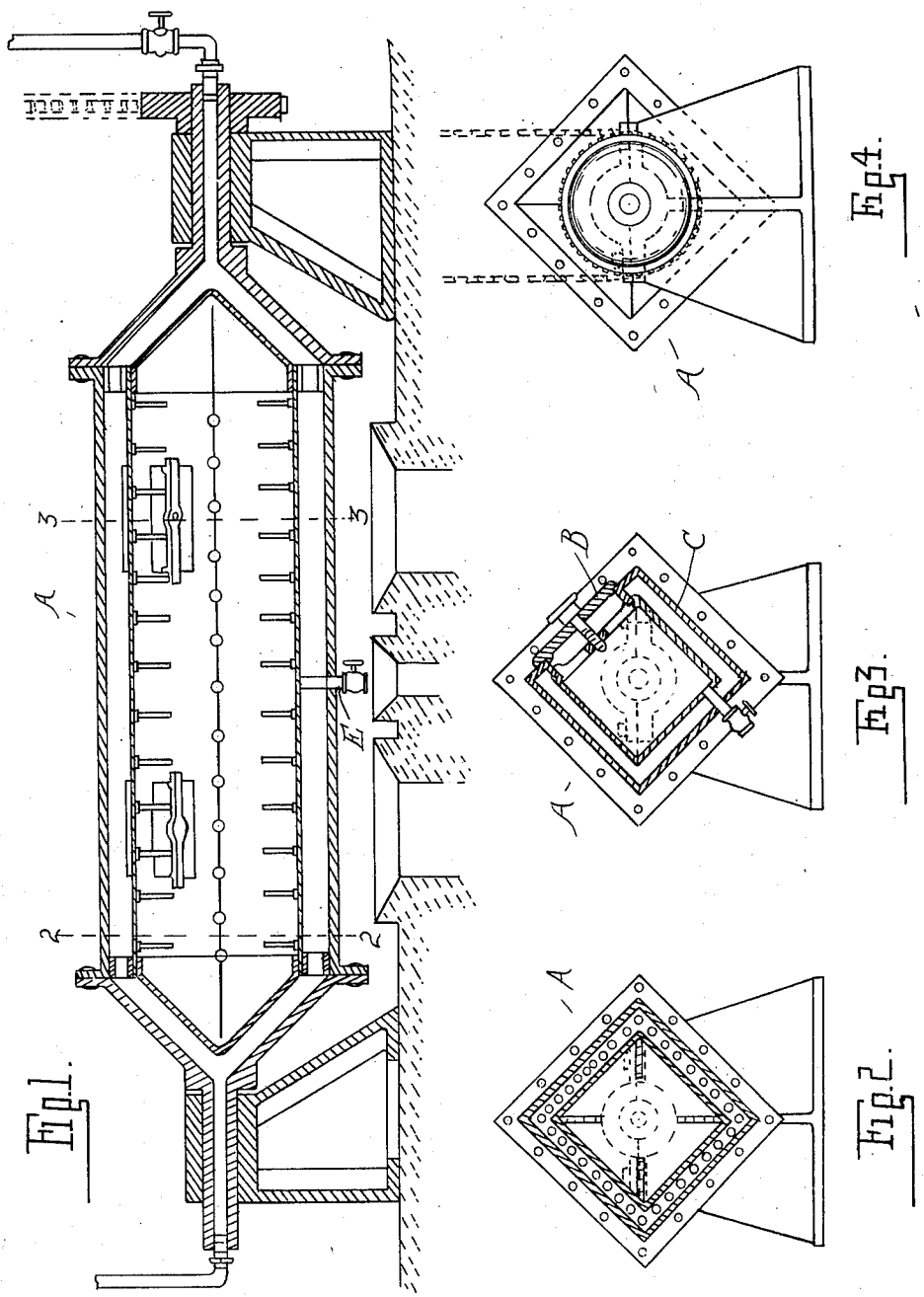
C. L. WEIBERG.
PROCESS OF EXTRACTING VEGETABLE FIBER.
APPLICATION FILED AUG. 1, 1910.
1,025,435. Patented May 7, 1912.

CONRAD L. WEIBERG, OF DETROIT, MICHIGAN.

PROCESS OF EXTRACTING VEGETABLE FIBER.

1,025,435.  Specification of Letters Patent.  Patented May 7, 1912.

Application filed August 1, 1910. Serial No. 574,971.

*To all whom it may concern:*

Be it known that I, CONRAD L. WEIBERG, a citizen of the United States of America, residing at Detroit, in the county of Wayne and State of Michigan, have invented certain new and useful Improvements in Processes of Extracting Vegetable Fiber, of which the following is a specification, reference being had therein to the accompanying drawings.

The invention relates to the extraction of fiber from various plants such as the banana plant, tobacco plant, hemp, flax, okra, sea-grass, etc., and it is the primary object of the invention to obtain a treatment by which the fibers may be extracted or separated from the binding material, such as resinous fats, etc.

It is a further object to effect the extraction of the fiber and disintegration of the plant in such a manner that valuable by-products may be preserved.

The specific process preferably employed varies according to the nature of the plant under treatment, but in all the various modifications, the general process of treatment is the same. I will therefore, first describe the broad process, following this with a description of some of the specific applications.

The drawings illustrate an apparatus which may be employed in carrying out the process and in which, Figure 1 is a longitudinal section through the digester; Figs. 2 and 3 are cross sections therethrough respectively on line 2—2 and 3—3 Fig. 1; and Fig. 4 is an end elevation.

In the present state of the art, fiber is extracted from wood by the use of various re-agents, generally having an acid reaction. My improved process differs from these, first, in that the treatment is with an alkaline re-agent, and further that the re-agent selected is one which while dissolving the resinous substances which cement the fibers, does not have a detrimental action on the fibers themselves. The re-agent preferably employed is sodium-peroxid $Na_2O_2$. Various substitutes may however be employed, such as sodium-carbonate, bicarbonate, calcium bisulfite, calcium sulfid, or other like substances.

Another distinguishing feature of my process is the employment of a protecting substance for the fiber during the digesting process. For this a non-saponifying, non-volatile oil, such as a heavy mineral oil or more specifically, paraffin oil may be used. The effect of the treatment is to saturate the fibers of the plant with the oil during the digesting process, thereby preventing detrimental action of the chemical re-agent and by reason of the fact that the oil is non-saponifying, it will not itself be affected by the re-agent.

In general, the process of treatment consists in placing the stocks, stems, etc., of the plant in a digester such as A by way of the manhole B together with a solution composed of the sodium-peroxid or other similar re-agent, and a non-saponifying oil. The digester is then closed and the solution is boiled by suitable means such as a steam jacket C, being also preferably agitated as by rotation. After several hours of treatment the fibers of the plant will become separated and the material is then drawn off, washed, and subjected to further purifying treatment according to the specific character of the product desired.

One specific application of my process is in the production of a textile fiber from the stems and stocks of the banana plant which I will now describe in detail. A suitable quantity, as for instance, 4,000 pounds of the stocks, stems, etc., of the banana plant, in lengths from 2 to 4 feet is introduced into the digester. The solution is formed by dissolving 10 pounds of sodium-peroxid in cold water which is introduced through the manhole, the solid material being about three quarters immersed in the solution. To this is added 10 gallons of heavy mineral oil, such as paraffin, specific gravity .895 to .907, after which the digester is closed and the solution boiled, preferably for 2 hours and preferably at a pressure from 2 to 4 pounds above atmosphere, being continuously agitated by the rotation of the kettle. At the end of this period the corrosive alkalis are introduced as follows: 200 pounds of sodium hydrate, and 100 pounds of potassium hydroxid, with sufficient water to make the specific gravity 1.0360. The mass is then cooked preferably for 2 hours' time and under like pressure as in the previous treatment, with the result that the wood or plants are transformed into long, silky fiber. The liquid is then drawn off as through the pipe E into any suitable receptacle and allowed to settle, after which the oil or clear liquid may be run off for use again in the next batch, the sediment being reserved for other commercial purposes. In place of the sodium hydrate and potassium hydroxyid used in the second treatment, sodium peroxid may be employed, but as the latter is much more expensive material I preferably carry out the process as described.

After separation of the fiber it is subjected to a suitable washing and purifying process, being preferably washed once or twice by soft warm water and then treated by a cleaning and softening solution of neutral potash linseed oil soap, and gasolene or petroleum, finally washing with soft warm water until the water is found to be colorless. The fiber is then removed through the manhole, is dried and bleached if desired and is then ready to be treated after the manner of wool or cotton when prepared for spinning. It may also be used for the manufacture of paper by many of the well known processes.

Another specific application of my process is the extraction of fiber from the tobacco plant and other plants of similar nature. In this process the treatment is varied from that employed in the treatment of textile fibers, and the character of the product obtained is also different from that resulting from the previously described treatment.

The particular object of this specific embodiment of my invention is to obtain a material which may be used as a substitute for wood, hard rubber and like substances in the construction of electrical insulators, wall covering and for pressed ornamental articles.

It is a further object to obtain valuable by-products such as the nicotin and resinous fats contained in the stems and stalks of the tobacco plant.

In carrying out the process, the stems and stalks of the plant are first treated by placing them in a solution for the extraction of the nicotin and resinous fats without the complete disintegration of the fiber. For this purpose I preferably employ sodium peroxid $Na_2O_2$ as this material I have found has very little corrosive action upon the fiber. I also preferably protect the fiber as in the process previously described by the use of a non-saponifying oil. More in detail a suitable quantity of tobacco stalks and stems as for instance 4,000 pounds is placed in a digester such as illustrated in the drawings and partially immersed in a solution preferably composed of 5 pounds of sodium peroxid dissolved in cold water, to this is added approximately 40 pounds of paraffin or other non-saponifying oil. The digester is then closed and the solution is then boiled for about 3 hours at a pressure preferably from 3 to 5 pounds above atmosphere. During the boiling of the material it is kept in constant agitation by the rotation of the digester as previously described. At the completion of the period the solution is drawn off carrying with it the nicotin and resinous fats, and other extracts which may be separated by any of the usual and well known processes for this purpose. The stems and stalks which remain in the digester are subjected to a further treatment to complete the disintegration of the same and to soften the fiber so that it may be molded or pressed into the desired form. For this purpose I preferably employ a compound composed of the following ingredients: 100 pounds of borax, $11\frac{1}{4}$ pounds of caustic soda (74%), $16\frac{5}{10}$ pounds of caustic potash (90%) and approximately 90 pounds of water or sufficient to make the specific gravity of the solution 1.1613. The solution is introduced into the digester and the fiber is again boiled preferably for about 2 hours and until complete disintegration is effected. The solution is then drawn off, the fiber is washed and is subsequently molded into the desired form, preferably under hydraulic pressure. The product obtained is a solid, tenacious, non-pliable substance of the electrical insulating character and may be rendered water proof or fire proof by further treatment.

What I claim as my invention is:

1. The process of separating vegetable fiber, which consists in boiling the stems, stalks, etc., of the plant in a solution of alkaline peroxid, and in the presence of a non-saponifying oil.

2. The process of extracting vegetable fiber, which consists in boiling the stems, stalks, etc., of plants in a solution having alkaline reaction, and in the presence of a non-saponifying oil, the initial treatment being with an alkaline peroxid, and a subsequent treatment with corrosive alkalis.

3. The process of separating vegetable fiber, which consists in boiling the stalks, stems, etc., of plants in a solution containing alkaline peroxid and a non-saponifying heavy oil and then introducing corrosive alkalis and boiling for a further period and in then drawing off the solution and washing the fiber.

4. The process of separating vegetable fiber, which consists in boiling the stems, stalks, etc., of plants, in a solution of alkaline peroxid, and in the presence of a protective oil of a non-saponifying nature.

5. The process of separating vegetable fiber which consists in boiling the stalks, stems, etc., of the plant in a solution of alkaline peroxid.

6. The process of separating vegetable fiber which consists in boiling the stems, stalks, etc., of the plant in a solution of sodium peroxid.

7. The process of separating vegetable fiber which consists in placing the stalks, stems, etc., of the plant in a solution of alkaline peroxid, in combination with a heavy mineral oil, in then agitating and boiling the mass for a suitable period, then introducing corrosive alkalis in the solution, then again cooking the mass for a further period, drawing off the oil and other liquid and washing.

8. The process of treating stalks, stems, etc., of plants which consists in boiling in a solution containing sodium peroxid limited in strength to avoid complete separation of the fiber but having an extractive action on substances contained in the wood, in removing the extract and reboiling in a stronger solution to complete the separation of the fiber.

9. The process of treating stalks, stems, etc., of the tobacco plant which consists in boiling the same in a solution containing sodium peroxid to extract the nicotin and resinous fats, in removing the extract and reboiling in a solution containing corrosive alkalis and borax.

10. The process of treating the stems, stalks, etc., of the tobacco plant which consists in boiling the same in a solution containing sodium peroxid, in removing the extract and reboiling in a solution containing potassium hydrate, sodium hydrate and borax to complete the separation of the fiber.

11. The process of treating stalks, stems, etc., of plants which consists in boiling the same in a solution composed substantially as follows: 100 pounds of borax, $11\frac{1}{4}$ pounds caustic soda, (74%), $16\frac{5}{10}$ pounds of caustic potash (90%), and approximately 90 pounds of water or sufficient to make the specific gravity of the solution 1.1613.

In testimony whereof I affix my signature in presence of two witnesses.

CONRAD L. WEIBERG.

Witnesses:
W. J. BELKNAP,
JAMES P. BARRY.